June 26, 1945.  G. G. RICHARDS  2,379,187
WELDING AND BRAZING ELECTRODE
Filed Dec. 11, 1943
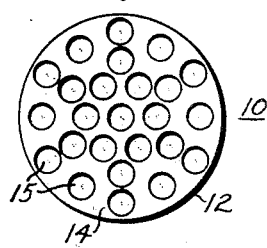
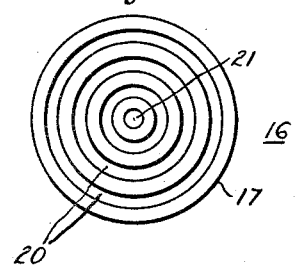
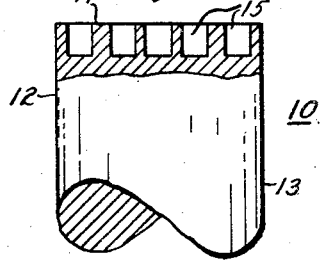
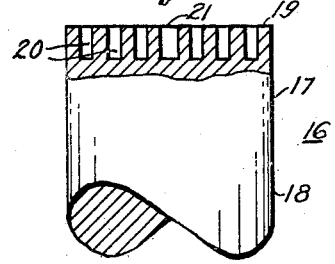
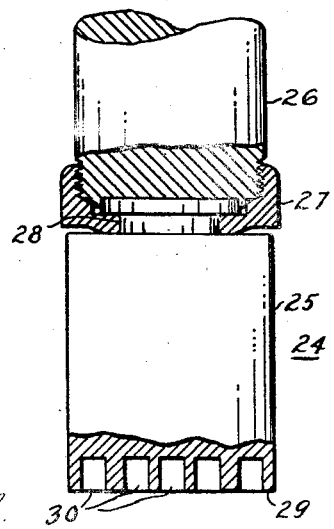
WITNESSES:
INVENTOR
Glenn G. Richards.
BY
ATTORNEY Patented June 26, 1945

2,379,187

UNITED STATES PATENT OFFICE 2,379,187

WELDING AND BRAZING ELECTRODE

Glenn G. Richards, Forest Hills, Pa., assignor to Westinghouse Electric Corporation, East Pittsburgh, Pa., a corporation of Pennsylvania Application December 11, 1943, Serial No. 513,859

8 Claims. (Cl. 219—4)

My invention relates, generally, to resistance welding and brazing, and it has reference in particular to resistance welding and brazing electrodes.

Generally stated, it is an object of my invention to provide an improved resistance welding or brazing electrode which is simple and inexpensive to manufacture and is easy and economical to use.

More specifically, it is an object of my invention to provide for localizing the heat produced in a spot welding or brazing electrode of the high resistance type by utilizing a reduced contact surface distributed over a relatively large area.

It is also an important object of my invention to provide for reducing the indentation of members which are being resistance welded or brazed by using an electrode having from 20 to 100 percent greater cross-sectional area than normal and reducing the effective contact surface thereof to substantially the normal area by providing a plurality of recesses in the contact surface or face of the electrode.

Another object of my invention is to provide for increasing the life of heat producing refractory resistance welding or brazing electrodes by using an electrode of greater than normal cross-sectional area and reducing the effective contact surface of the electrode to the normal area but distributed over greater than the normal area.

Yet another object of the invention is to limit the heat in refractory tungsten, molybdenum and copper tungsten alloy resistance welding or brazing electrodes principally to a zone adjacent the face of the electrode.

A further object of my invention is to reduce the welding time and prevent checking and crumbling of sintered refractory high resistance welding and brazing electrodes by limiting the heat produced therein to a relatively narrow zone adjacent the contact surface or face of the electrode which engages the work to be welded or brazed.

Other objects will in part be obvious, and will in part be described hereinafter.

In accordance with my invention improved welds may be made particularly when using a high resistance spot welding or brazing electrode by using an electrode having a cross-sectional area which is 20 to 100 percent greater than the normal cross-sectional area and reducing the effective area to substantially normal by drilling or machining a plurality of recesses in the contact surface. By placing these recesses more or less uniformly over the contact surface and having them penetrate the surface only to a relatively slight depth, the principal portion of the welding heat is developed at the face of the electrode where it is needed, and, because of the distribution of the contact surface, indenting of the material to be welded is substantially prevented.

For a more complete understanding of the nature and scope of my invention reference may be made to the accompanying drawing, in which:

Figure 1 is an enlarged end view of an electrode embodying the principal features of the invention;

Fig. 2 is a partly sectioned side elevational view of the electrode of Fig. 1;

Fig. 3 is an enlarged end view of an electrode embodying the invention in another of its forms;

Fig. 4 is a partly sectioned side elevational view of the electrode shown in Fig. 3; and Fig. 5 is a partly sectioned side elevational view of an electrode embodying the invention in yet another of its forms.

Referring to Figs. 1 and 2, the reference numeral 10 may denote, generally, a resistance welding or brazing electrode which may comprise a relatively high resistance heat producing tip 12 and a relatively low resistance body member 13. The tip 12 may, for example, be made of any suitable refractory material such as tungsten, molybdenum, a tungsten copper alloy, or the like. The tip 12 may be secured in any suitable manner, such as by brazing, to the body member 13 which may be made of copper or a copper alloy, and by which it may be supported in a welding machine in a suitable holder (not shown).

In order to improve the welding and brazing characteristics of the electrode 10, the contact surface 14 at the end thereof may be provided with a plurality of holes or recesses 15. The recesses 15 may, for example, be distributed more or less uniformly over the contact surface although not necessarily in any prescribed pattern. In general, highly satisfactory results may be obtained by providing a sufficient number of recesses 15 in the contact face to reduce the effective contact surface thereof about 20 to 50 percent from what it was originally. Thus, as for a given welding job in which it would be customary to use a one-half inch diameter electrode having a substantially flat contact surface, according to my invention a five-eighth inch diameter electrode may be used and sufficient holes may be drilled therein to reduce the effective contact area of the tip about 30 percent to substantially the customary amount. If a tapered tip is used the end surface should be increased from two to three times. A sufficient number of holes should then be drilled to reduce the effective contact surface to slightly more than the original area.

In one instance a straight one-half inch electrode was used, having approximately 30 holes of .050 inch diameter drilled therein to a depth of one-eighth of an inch, thus providing substantially 30 per cent reduction in contact area. This resulted in a relatively high current density zone at the contact surface, so that the principal portion of the heat developed by the electrode was produced substantially at the face of the electrode. The remaining portion of the electrode having a much larger actual cross-section and therefore a much lower current density, remained comparatively cool. The life of the electrode was greatly increased and replacement of tips was required only every 72 hours instead of every 8 hours or less as previously required when the straight one-half inch electrode was used.

A typical application was joining a ⅛" x ⅛" square copper wire to a 1" x 1" x ⅛" copper terminal. A drilled molybdenum tip was used against the terminal and a copper alloy tip against the wire. This resulted in an excellent weld with no indentation. The weld time was reduced 30 percent and the life of the tips increased from 8 hours to 72 hours. In another job which could not be done satisfactorily otherwise, a drilled molybdenum tip was used in silver brazing a copper terminal to a 13% chrome, 3½ aluminum steel strip.

Referring to Figs. 3 and 4, the reference numeral 16 may denote, generally, a resistance welding or brazing electrode having a high resistance molybdenum tip 17 secured to a relatively high conductivity copper alloy body member 18. The contact surface 19 of the tip 17 may be provided with a plurality of recesses comprising, for example, a plurality of substantially parallel grooves 20 which may be concentric about a central opening 21. The grooves may be formed in any suitable manner or in other suitable patterns, and may be so spaced as to secure a similar reduction in the effective contact surface, on the order of 20 to 50 percent provided in the electrode of Figs. 1 and 2. Increased life and concentration of the heating with the resultant reduction in welding time may be secured in substantially the same degree as with the electrode of Figs. 1 and 2.

Referring to Fig. 5 the reference numeral 24 may denote, generally, an electrode construction wherein a high resistance tip 25 of carbon or the like may be secured to a suitable metallic support member 26 by means of a clamp ring 27. Since the tip 25 is provided with a relative reduced neck portion 28 in order to cooperate with the clamping ring 27, a relatively high concentration of welding current occurs therein. With electrode tips of the conventional type having a full contact face, a large amount of the heat produced by the tip is produced at the neck 28, so that the maximum heat is not developed at the contact surface 29 where it is to be used. By providing the contact surface with a plurality of recesses 30 so as to reduce the effective contact area at the face 29 to a value less than the area of the neck 28, improved operating results may be obtained. By thus reducing the effective area of the contact face the principal heat is developed at the contact face where it may be most effectively used. The time required for the work to reach the desired welding or brazing temperature is thus reduced. The life of the electrode tip is greatly increased since the tip may be easily resurfaced should the contact surface become cracked or chipped. Since the neck portion remains comparatively cool, the carbon remains mechanically strong in this area.

From the above description and the accompanying drawing it will be apparent that I have provided in a simple and effective manner for improving the operating characteristics of resistance welding and brazing electrodes. Indentation of the members being welded or brazed is substantially prevented since the actual contact area of the electrode with the work is distributed over a much larger area. Since the cross-sectional area of the electrode for a given effective contact surface is much greater than with the usual type of electrode the body of the electrode and the tip remain relatively cool. Substantially all of the heat is produced at the contact surface where it may be effectively used so that the heating time of the electrode is reduced. Electrodes embodying the invention have a life in excess of from four to five times normal, and the problem of balancing the heat on both sides of members of different thermal capacities and conductivities being welded is made much less critical. By providing recessed electrodes in the manner of the invention, molybdenum or copper tungsten electrodes may be used to produce the desired heat characteristics where it was previously necessary to use carbon electrodes. Accordingly, a much longer electrode life may be secured at the same time the welding time may be greatly reduced.

Since certain changes may be made in the above description, and different embodiments of the invention may be made without departing from the spirit or scope thereof, it is intended that all of the matter contained in the above description or shown in the accompanying drawing shall be considerable as illustrative and not in a limiting sense.

I claim as my invention:

1. A welding electrode comprising, a conductive body member having a tip of a relatively high resistance material for engaging work to be welded and supplying heat thereto with a distributed contact surface of substantially less area than the cross-sectional area at the surface for concentrating the flow of heat from the tip to the work at predetermined locations.

2. A relatively high resistance heat producing electrode comprising, a body member of a relatively high resistance heat producing material having a contact surface with a plurality of relatively shallow recesses distributed therein to reduce the actual contact surface and increase the heat produced in the electrode adjacent the face without reducing the overall size of the contact surface.

3. A high resistance welding or brazing electrode comprising, a body member of molybdenum having an electrode face at one end with a plurality of circular openings distributed over the surface thereof to provide a plurality of concentrated heat and current paths having a predetermined conducting cross-section distributed over a larger cross-sectional area of the electrode.

4. A resistance welding or brazing electrode comprising, a body member of a relatively high resistance heat producing material having a face at one end, said face having a plurality of openings distributed therein for reducing the effective area of the face from about 20 to 50 percent and increasing the heat producing qualities of the electrode without reducing the overall size of the face.

5. A refractory welding or brazing electrode comprising, a body portion of a high resistance material having a contact surface on one end with a plurality of relatively small holes drilled therein and distributed thereover for reducing the effective contact area of the face from about 15 to 40 percent and concentrating the flow of heat from the electrode without appreciably reducing the overall dimensions of the contact surface.

6. A welding or brazing electrode for applying heat to work upon the passage of an electric current therethrough comprising, a body member of a relatively high resistance material having a contact surface at one end with a plurality of relatively small circular openings distributed over the surface and restricted to a relatively narrow zone adjacent the contact surface for increasing the electrode temperature.

7. An electrode for applying heat externally of work upon the passage of an electric current therethrough comprising, a body member of molybdenum with a contact surface at one end having a plurality of shallow grooves distributed over the face to reduce the effective contact area about 20 to 50 percent and increase the concentration of heat flow to the work.

8. A welding or brazing electrode for applying heat externally of work upon the passage of an electric current comprising, a substantially cylindrical body member of a relatively high resistance material having a contact surface at one end with a plurality of spaced relatively shallow concentric grooves therein for reducing the effective contact surface about 15 to 40 percent and increasing the heating effect in the electrode at the contact surface.

GLENN G. RICHARDS.